J. M. ROE.
LOCK NUT.
APPLICATION FILED APR. 18, 1912.
1,070,844.
Patented Aug. 19, 1913.
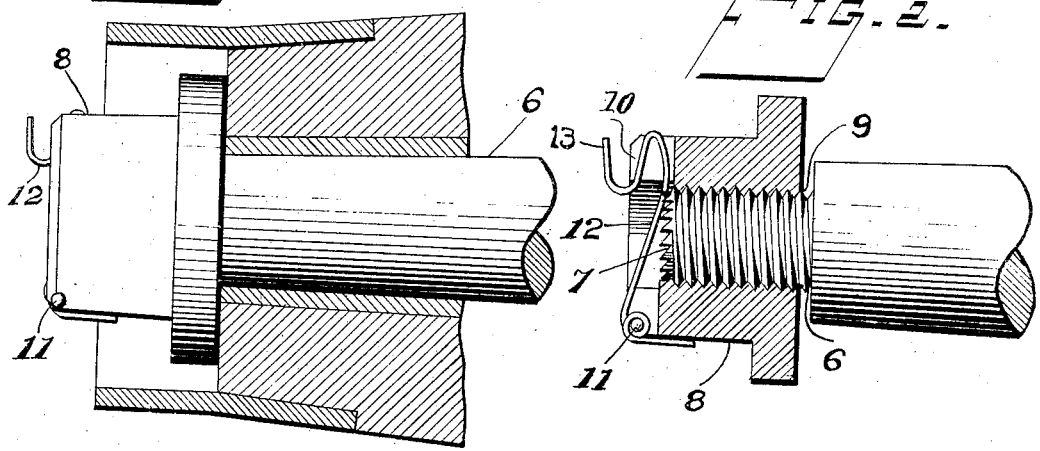
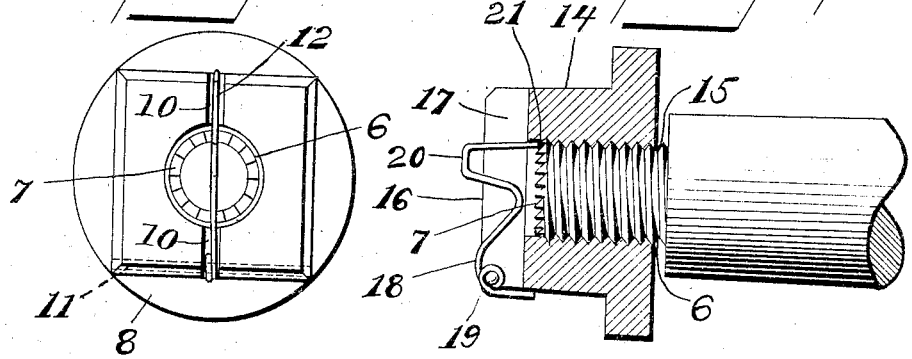
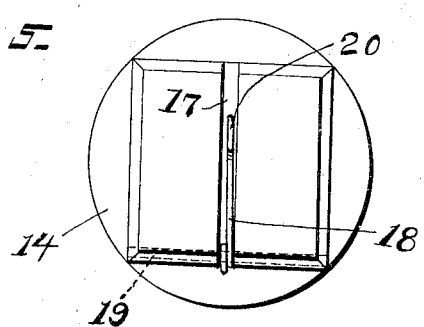
Witnesses
Charles R. Bealle.
L. Mueller.
Inventor
J. M. Roe.
By Victor J. Evans
Attorney

UNITED STATES PATENT OFFICE.

JACKSON M. ROE, OF SUNNYSIDE, WASHINGTON, ASSIGNOR OF ONE-HALF TO OREN W. CRIDER, OF SUNNYSIDE, WASHINGTON.

LOCK-NUT.

1,070,844.  Specification of Letters Patent.  Patented Aug. 19, 1913.

Application filed April 18, 1912. Serial No. 691,745.

*To all whom it may concern:*

Be it known that I, JACKSON M. ROE, a citizen of the United States, residing at Sunnyside, in the county of Yakima and State of Washington, have invented new and useful Improvements in Lock-Nuts, of which the following is a specification.

The general object of this invention is the provision of a locking nut particularly adapted for use in connection with axle spindles, said nuts being constructed in a novel manner and provided with means for engaging the free end of a spindle whereby the rotation of said nut on said spindle will be prevented, thus insuring against accidental displacement thereof.

In carrying out the objects of the invention generally stated above, it will be understood, of course, that the essential features thereof are susceptible to changes in details and structural arrangements, preferred and practical embodiments being shown in the accompanying drawing, wherein:—

Figure 1 is a side elevation of a preferred form of the invention. Fig. 2 is a vertical longitudinal sectional view thereof. Fig. 3 is an end elevation. Fig. 4 is a vertical longitudinal sectional view of a further embodiment of the invention. Fig. 5 is an end elevation of the modified form.

Referring to the accompanying drawing and more particularly to Figs. 1 to 3 inclusive, 6 indicates the spindle of the ordinary well known construction and having its outer end provided with the serrations 7 for a purpose which will be presently described. The nut 8 is provided with the threaded opening 9 which is adapted to engage the threads of the spindle, said nut being provided in its outer end with alined slots 10. A pivot pin 11 is mounted in said nut adjacent one edge thereof and extends at right angles to the alined slots 10. Mounted in one of the slots 10 and coiled about the pivot pin 11 is a locking spring 12 which is formed from a single length of suitable metal, one end of said spring being adapted to engage the adjacent outer surface of said nut whereby the free end of said spring which extends across the nut is tensioned and caused to normally be seated in the opposite slot 10 so that said spring will engage the serrations formed in the end of the spindle 6. When in this position the nut will be prevented from rotation upon the spindle whereby the possibility of displacement of the same will be obviated. The free extremity of the spring 12 is bent upon itself to provide a finger grip 13 whereby said spring may be drawn from engagement with the serrations 7 and thus permit the ready removal of the nut.

The embodiment shown in Figs. 4 and 5 of the drawing comprises a nut 14 having a threaded opening 15 extending longitudinally thereof, said nut being provided with a closed outer end 16 having an elongated slot 17 therein in which is mounted a locking spring 18, one end of which is coiled about the pivot pin 19 which extends at right angles to the slot 17. The locking spring 18 is provided intermediate its ends with a lateral extension 20 which projects beyond the outer end 16 of the nut thus affording a finger grip whereby the free end 21 of said spring may be withdrawn from engagement with the serrations formed on the end of the spindle thus permitting the free removal of the nut therefrom.

From the foregoing description taken in connection with the drawing it will be seen that the invention contemplates providing a nut lock which is simple in construction thus reducing the cost of manufacture of the same to a minimum and which is effective in carrying out the purpose for which it is designed.

What is claimed is:—

The combination with a spindle having serrations formed at its outer end, of a nut mounted upon said spindle and having a transverse slot in its outer end, and a locking spring having a major portion thereof inclosed in said slot and adapted to engage said serrations for preventing rotation of said nut, a portion of said spring being bent to provide a finger catch which extends beyond the outer surface of said nut.

In testimony whereof I affix my signature in presence of two witnesses.

JACKSON M. ROE.

Witnesses:
W. A. FUNK,
H. A. BOOSE.

---

Copies of this patent may be obtained for five cents each, by addressing the "Commissioner of Patents, Washington, D. C."